US011391385B1

(12) United States Patent
Hurley

(10) Patent No.: US 11,391,385 B1
(45) Date of Patent: Jul. 19, 2022

(54) VALVE EXERCISER CONTROLS

(71) Applicant: HURCO TECHNOLOGIES, INC., Harrisburg, SD (US)

(72) Inventor: Michael Hurley, Sioux Falls, SD (US)

(73) Assignee: Hurco Technologies, Inc., Harrisburg, SD (US)

(*) Notice: Subject to any disclaimer, the term of this patent is extended or adjusted under 35 U.S.C. 154(b) by 31 days.

(21) Appl. No.: 16/922,511

(22) Filed: Jul. 7, 2020

(51) Int. Cl.
*F16K 31/04* (2006.01)

(52) U.S. Cl.
CPC .................. *F16K 31/043* (2013.01)

(58) Field of Classification Search
CPC ..... F16K 31/043; F16K 31/042; F16K 31/045
USPC .................................... 251/129.13
See application file for complete search history.

(56) References Cited

U.S. PATENT DOCUMENTS

| | | | | |
|---|---|---|---|---|
| 4,090,532 A * | 5/1978 | Story, Jr. | ................. | F15B 21/02 137/624.15 |
| 4,561,459 A * | 12/1985 | Jackman | ................... | E03B 9/04 137/291 |
| 5,137,257 A * | 8/1992 | Tice | ........................ | F16K 31/04 185/40 R |
| 5,381,996 A * | 1/1995 | Arnemann | .............. | F16K 31/12 137/554 |
| 6,125,868 A * | 10/2000 | Murphy | .................. | F16K 31/46 137/1 |
| 6,957,802 B2 * | 10/2005 | Fortino | ................... | F16K 27/07 251/291 |
| 7,334,606 B1 * | 2/2008 | Hurley | .................... | F16K 31/46 137/899 |
| 7,415,376 B1 * | 8/2008 | Hurley | .................... | F16K 31/46 415/13 |
| 7,703,473 B1 * | 4/2010 | Hurley | .................... | F16K 31/46 137/343 |
| 2014/0261726 A1 * | 9/2014 | Shurina | ................... | F16K 29/00 137/15.01 |
| 2016/0201823 A1 * | 7/2016 | Ferrar | ................... | B25B 21/002 251/129.13 |
| 2018/0031142 A1 * | 2/2018 | Hillo | ..................... | F16K 31/042 |

OTHER PUBLICATIONS

Spin Doctor Reference Manual and User's Guide, reference manual, rev. Nov. 22, 2019, 32 pages, Hurco Technologies, Inc.

\* cited by examiner

*Primary Examiner* — Umashankar Venkatesan
(74) *Attorney, Agent, or Firm* — Jeffrey A. Proehl; Woods, Fuller, Shultz & Smith, PC

(57) ABSTRACT

A valve operating apparatus with controls may include a speed control engageable by a hand of an operator of the apparatus to control a speed characteristic for operating the valve. The speed control may have a zero position corresponding to a zero speed of rotation of a shaft for connecting to the valve, with the speed control being movable out of the zero position to a nonzero position corresponding to a nonzero speed of rotation. A degree of movement of the speed control from the zero position may correspond to a speed of rotation of the shaft such that further movement of the control away from the zero position increases the speed of rotation. Movement of the speed control from the zero position may be characterized by the speed control maintaining the position of the speed control when engagement of the control by the hand of the operator is discontinued.

17 Claims, 3 Drawing Sheets

VALVE EXERCISER CONTROLS

BACKGROUND

Field

The present disclosure relates to valve exerciser and more particularly pertains to a new valve exerciser controls for facilitating control of the speed of rotation of a valve operating apparatus.

SUMMARY

In one aspect, the present disclosure relates to a valve operating apparatus for operating a valve having a stem rotatable to operate the valve. The apparatus may comprise a frame assembly, a valve operating motor mounted on the frame with a shaft being rotated during operation of the motor, and controls mounted on the frame assembly and configured to control operation of the valve operating motor. The controls may include a speed control engageable by a hand of an operator of the valve operating apparatus to control a speed characteristic of the movement of the shaft of the operating motor. The speed control may have a zero position corresponding to a zero speed of rotation of the shaft of the operating motor, with the speed control being movable out of the zero position to a nonzero position corresponding to a nonzero speed of rotation. A degree of movement of the speed control from the zero position may correspond to a speed of rotation of the shaft of the operating motor such that further movement of the speed control away from the zero position increases the speed of rotation of the shaft of the motor and movement of the speed control toward the zero position decreases the speed of rotation of the shaft of the motor. Movement of the speed control from the zero position may be characterized by the speed control maintaining the position of the speed control when engagement of the speed control by the hand of the operator is discontinued.

In another aspect, the present disclosure relates to a valve operating apparatus for operating a valve having a stem rotatable to operate the valve. The apparatus may comprise a frame assembly, a valve operating motor mounted on the frame with a shaft being rotated during operation of the motor, and controls mounted on the frame assembly and configured to control operation of the valve operating motor. The controls may include a speed control engageable by a hand of an operator of the valve operating apparatus to control a speed characteristic of the movement of the shaft of the operating motor, and the speed characteristic may comprise a speed of rotation of the shaft of the operating motor. The speed control may be configured to control a direction of rotation of the shaft of the operating motor, and may be movable out of the zero position in two movement directions. A first one of the movement directions of the speed control may correspond to a first rotational direction of the shaft of the operating motor and a second one of the movement directions of the speed control may correspond to a second rotational direction of the shaft of the operating motor. The speed control may have a zero position corresponding to a zero speed of rotation of the shaft of the operating motor, and the speed control maybe movable out of the zero position to a nonzero position. A degree of movement of the speed control from the zero position may correspond to a speed of rotation of the shaft of the operating motor such that further movement of the speed control away from the zero position increases the speed of rotation of the shaft of the motor and movement of the speed control toward the zero position decreases the speed of rotation of the shaft of the motor. Movement of the speed control from the zero position in at least one of the movement directions may be characterized by the speed control maintaining the position of the speed control when engagement of the speed control by the hand of the operator is discontinued.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
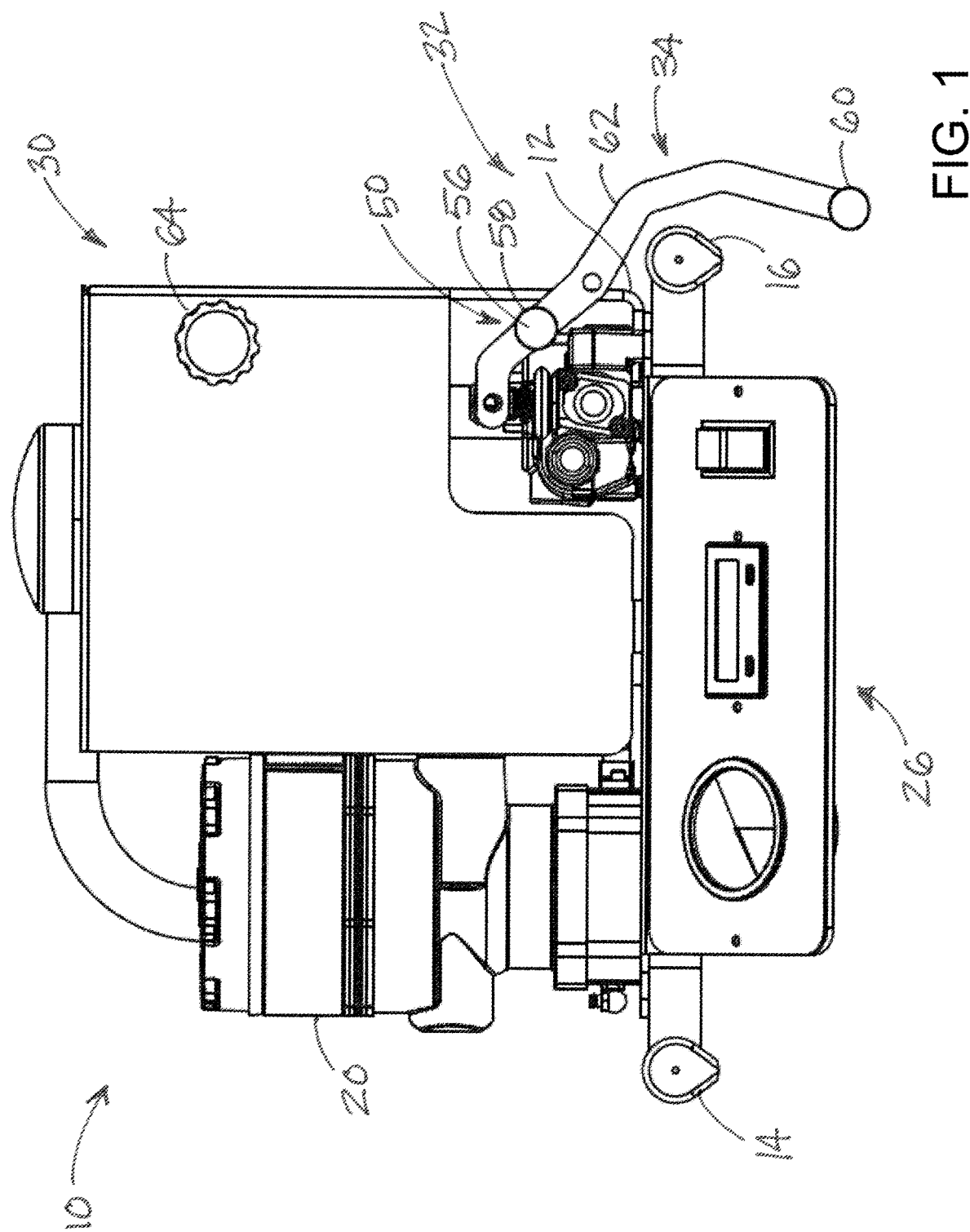
FIG. 1 is a schematic front view of controls for a valve exerciser according to the present disclosure.
Figure 2:
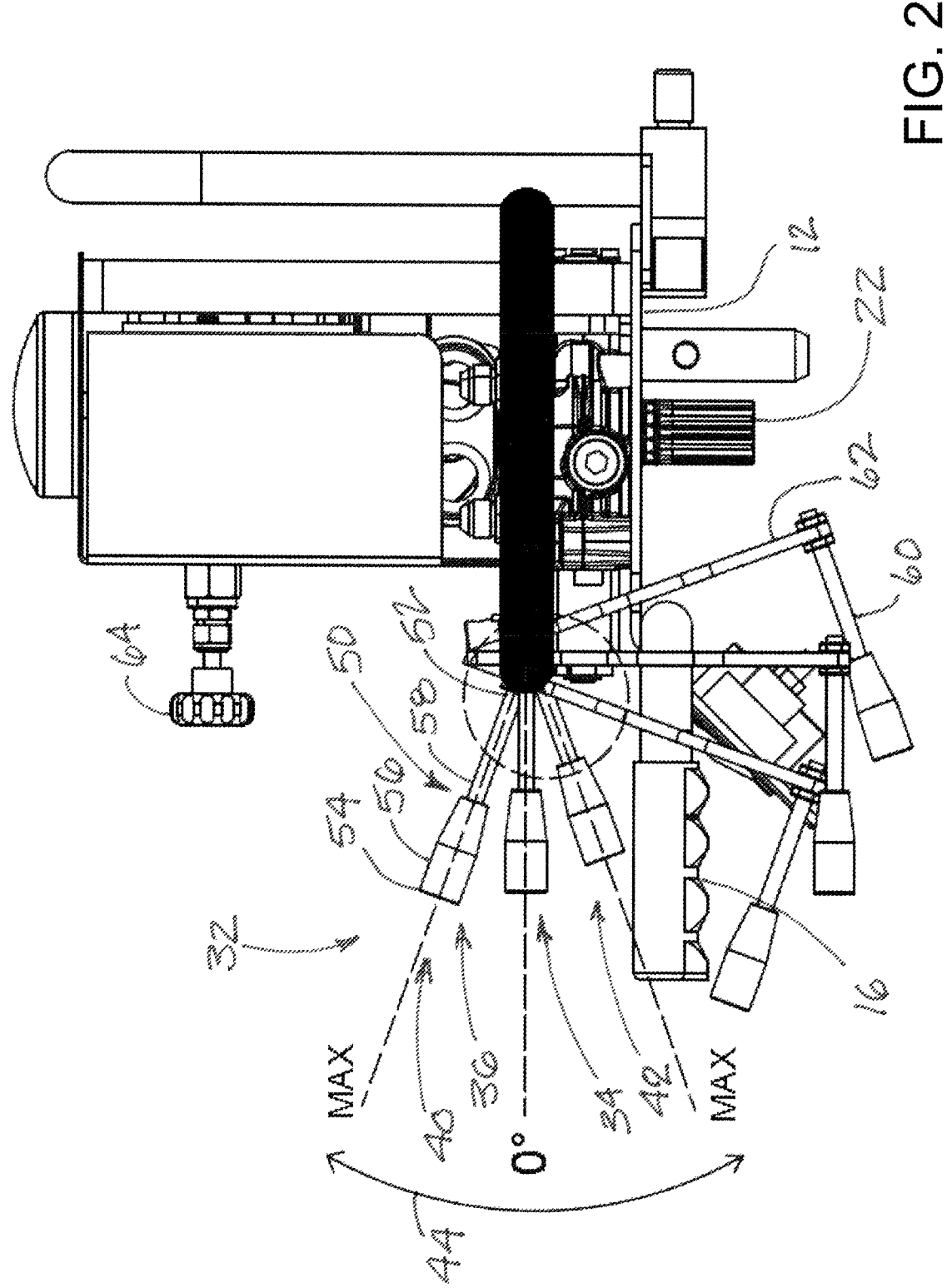
FIG. 2 is a schematic side view of the controls for a valve exerciser showing the speed control lever in a variety of positions, according to an illustrative embodiment.
Figure 3:
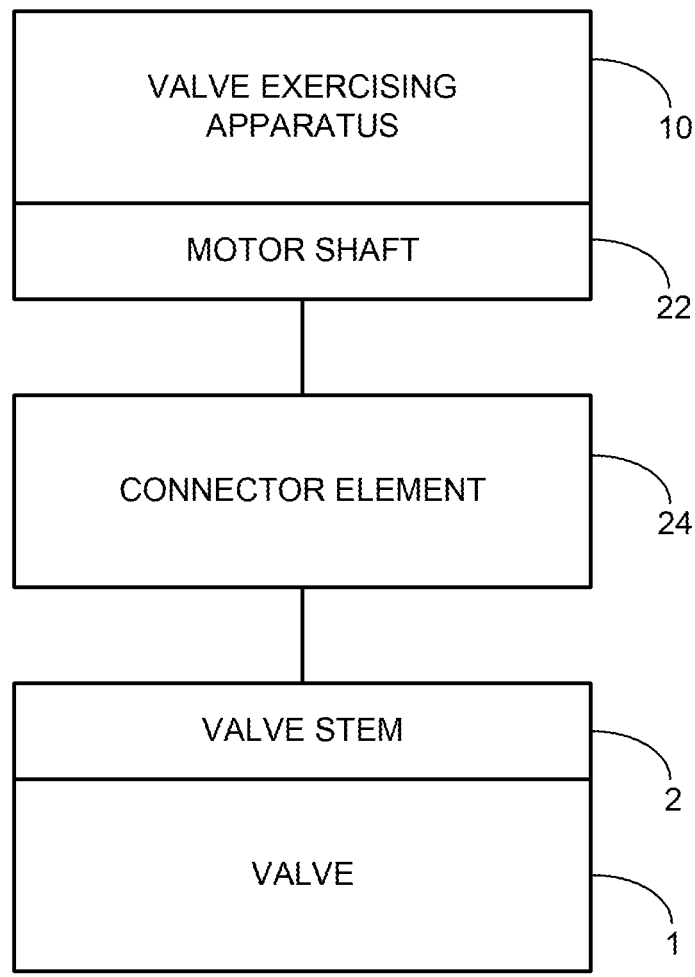
FIG. 3 is a schematic diagram of a valve exerciser and associated environment, according to an illustrative embodiment.

With reference now to the drawings, and in particular to FIGS. 1 through 3 thereof, new valve exerciser controls embodying the principles and concepts of the disclosed subject matter will be described.

Fluid valves, such as water supply valves on a municipal water supply network, typically remain in an open condition for extended periods of time and only occasionally need to be closed for maintenance or other reasons. These long periods of non-operation can lead to problems in operating the valve between open and closed conditions when needed, and can also hide the fact that the valve is inoperative. Periodically operating, or "exercising," the valve can be beneficial for maintaining the valve in an operational condition, and for detecting a problem with the operational condition of the valve at a time that is less critical than when the valve must be closed for network maintenance or repair or other circumstances when the discovery of a broken valve can be inconvenient.

The valve exercising operation typically involves operating the valve between open and closed conditions, such as from a "normally" open condition to a closed condition and back to the open condition. The speed at which the valve is operated, as well as the force, or torque, applied to the valve to operate it may be varied depending upon the condition of the valve among other factors.

Conventionally, control of the speed of rotation of the valve stem by an exercising apparatus has been characterized by the speed control having a "dead man's switch" operational characteristic in that the speed control is biased towards a zero speed position if the operator of the exercising apparatus discontinues holding the speed control at a position of a selected speed. In other words, as long as the apparatus operator continues to apply a force that moves (or holds) the speed control out of the zero speed position for the control, rotation of the valve by the apparatus continues at the speed corresponding to the position of the control. Once the operator discontinues application of force to the speed control, the bias inherent in the speed control returns the speed control to the zero speed position as a safety measure in case the operator becomes incapacitated or otherwise unable to consciously control the speed control.

The applicant has recognized that the danger in operating the valve exercising apparatus does not exist in the unattended operation of the valve by the exercising apparatus, but instead by the operation of the valve using torque that exceeds a safe torque level for the particular valve being exercised. Excessive torque being applied to a valve can be mitigated or prevented by sensors and controls that monitor the torque being applied and that interrupt operation of the valve if excessive torque is sensed. In contrast, with respect to unintentional rotation of the valve, exceeding safe rotational speeds or encountering a rotational limit of the valve typically causes a significant increase in the torque sensed by the sensors and leads to a shutdown of the apparatus.

In some aspects, the disclosure relates to a valve exercising apparatus 10 for operating or exercising a valve 1 typically having a stem to operate the valve between open and closed conditions.

The valve exercising apparatus 10 may include a frame assembly 12 which may be supported using any suitable structure, such as, for example, using an adjustable support arm. Some examples of suitable support arms are disclosed in U.S. Pat. Nos. 7,334,606; 7,376,529; 7,415,376; 7,607,624; and 7,703,473, all of which are hereby incorporated by reference in their entireties. The frame assembly 12 may include at least one guide handle 14 providing a structure to be gripped by the hand of the operator of the apparatus 10 to move and guide the apparatus to a suitable location and orientation with respect to the valve to be operated. In the illustrative embodiments, the frame 12 includes a pair of guide handles 14, 16 which are laterally spaced from each other.

The apparatus 10 may also include a valve operating or exercising motor 20 which is mounted on the frame 12, in which may have a rotatable shaft 22 which is rotated by the motor during operation of the motor. The apparatus 10 may also include a connector element 24 which connects the shaft 22 of the valve exercising motor 20 to the stem 2 of the valve 1, and the ends of the connector element may be suitably configured to engage the shaft 22 as well as the stem 2 of the valve.

The valve exercising apparatus 10 may further include a control panel 26 which is mounted on the frame 12, and illustratively the panel 26 may be at least partially positioned between the pair of guide handles 14, 16. Controls 30 may be provided for controlling various aspects of the operation of the valve exercising motor 20, and the controls may be located on the control panel 26.

One of the controls 30 may comprise a speed control 32 engageable by the hand of the operator of the exercising apparatus 10 to control a speed characteristic of the movement of the shaft 22 of the motor 20. The speed characteristic adjustable via the speed control 32 may comprise a speed of rotation of the shaft 22 of the exercising motor 20 with respect to, for example, the frame 12. Another speed characteristic adjustable via the control 32 may comprise a direction of rotation of the motor shaft 22. Illustratively, the speed control 32 may be mounted on the frame 12 adjacent to the control panel 26 at a location permitting the control 32 to be readily accessed by the hand of the operator, such as when the operator's hand is on one of the guide handles 14, 16.

The speed control 32 may have a zero position 34 which may correspond to a zero (or no) speed of rotation of the shaft 22. The speed control 32 may be movable out of the zero position 34 to a nonzero position 36 which may initiate rotation of the shaft 22. In some embodiments, the speed control 32 may be movable out of the zero position 34 in two movement directions 40, 42. A first one 40 of the movement directions of the speed control 32 may correspond to rotation of the shaft 22 in a first rotational direction, or direction of rotation. A second one 42 of the movement directions of the speed control 32 may correspond to rotation of the shaft 22 in a second rotational direction, or direction of rotation. Optionally, the movement directions 40, 42 may be oriented substantially opposite of each other in a substantially linear relationship. Illustratively, the first movement direction may be in a substantially upward direction and the second movement direction may be in a substantially downward direction, although other orientations of the directions of movement may be employed.

In some embodiments of the speed control 32, a degree of movement 44 of the control 32 from the zero position 34 in at least one of the movement directions 40, 42 may correspond to a speed of rotation of the motor shaft 22 such that further movement of the control 32 away from the zero position increases the speed of rotation of the shaft 22, and movement of the speed control 32 toward the zero position 34 decreases the speed of rotation of the motor shaft 22.

Significantly, the speed control 32 is configured such that movement of the control 32 from the zero position 34 in at least one of the movement directions 40, 42 is characterized by the speed control 32 maintaining the position of the speed control when engagement of the speed control by the hand of the operator is discontinued, and thus substantially maintaining the speed of rotation of the shaft 22. Thus, the position of the speed control does not change upon removal of a moving force applied to the speed control 32 by the operator's hand, and the speed of rotation of the shaft 22 does not change (although the speed may be affected by external influences, such as resistance to rotation of the valve). Movement of the speed control 32 to the zero position 34 from a nonzero position 36 may require application of a force to the control 30, such as by engagement of the speed control by the operator's hand, to change the speed of rotation of the shaft 22.

In the illustrative embodiments, the speed control 32 may comprise a lever 50 which is movable with respect to the frame 12. The lever 50 may be pivotably movable in at least one movement direction 40 from the zero position 34, and may also be pivotably movable in the second movement direction 42. The lever 50 of the speed control 32 may be elongated with the base end 52 which is pivotally mounted on the frame 12. The lever may also have a free end 54 which may be engaged by the hand of the operator of the valve exercising apparatus 10. Optionally, a knob 56 may be located on the free end 54 of the lever to facilitate engagement or hand gripping of the lever.

In some embodiments, the lever 50 of the speed control 32 may comprise a primary lever 58 and may additionally comprise a secondary lever 60 which is configured to move in substantial unison with the primary lever 58. Optionally, the primary lever 58 may be located above one of the guide handles on the frame assembly 12 and the secondary lever 60 may be located below and/or beside the guide handle. The secondary lever 60 may be connected to the primary lever 58 by a linking element 62 to cause the primary and secondary levers to move or pivot as a unit. As a further option, the linking element 62 may have an offset portion on which the secondary lever 60 is mounted to position the lever 60 laterally outwardly from the guide handle.

The controls 30 may also include a torque control 64 which is engageable by the hand of the operator of the valve exercising apparatus 10 to control a torque characteristic of the movement of the shaft 22 by the exercising motor 30. The torque characteristic may comprise a degree of torque applied by the shaft 22 of the exercising motor to the stem 2 of the valve 1 being exercised (e.g., via the connector element 24).

During operation of the valve exercising apparatus 10, both the speed control 32 and the torque control 64 may be adjusted by the person operating the apparatus 10.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A valve operating apparatus for operating a valve having a stem rotatable to operate the valve, the apparatus comprising:
   a frame assembly;
   a valve operating motor mounted on the frame with a shaft being rotated during operation of the motor;
   controls mounted on the frame assembly and configured to control operation of the valve operating motor, the controls including:
      a speed control lever engageable by a hand of an operator of the valve operating apparatus to control a speed characteristic of the movement of the shaft of the operating motor;
      wherein the speed control lever has a zero position corresponding to a zero speed of rotation of the shaft of the operating motor, the speed control lever being movable out of the zero position to a nonzero position corresponding to a nonzero speed of rotation;
      wherein a degree of movement of the speed control lever from the zero position corresponds to a speed of rotation of the shaft of the operating motor such that further movement of the speed control lever away from the zero position increases the speed of rotation of the shaft of the motor and movement of the speed control lever toward the zero position decreases the speed of rotation of the shaft of the motor; and
      wherein the speed control lever is configured such that movement of the speed control lever from the zero position to the nonzero position is characterized by the speed control lever maintaining the nonzero position of the speed control when engagement of the speed control lever by the hand of the operator is discontinued.

2. The apparatus of claim 1 wherein the speed control lever is configured such that movement of the speed control lever to the zero position from the nonzero position requires engagement of the speed control lever by the hand of the operator of the valve operating apparatus.

3. The apparatus of claim 1 wherein the speed control lever is configured such that movement of the speed control lever to the zero position from the nonzero position requires movement of the speed control lever by the hand of the operator.

4. The apparatus of claim 1 wherein the speed control lever is configured such that movement of the speed control lever to the zero position from the nonzero position requires application of a moving force by the hand of the operator to the speed control lever.

5. A valve operating apparatus for operating a valve having a stem rotatable to operate the valve, the apparatus comprising:
   a frame assembly;
   a valve operating motor mounted on the frame with a shaft being rotated during operation of the motor;
   controls mounted on the frame assembly and configured to control operation of the valve operating motor, the controls including:

a speed control engageable by a hand of an operator of the valve operating apparatus to control a speed characteristic of the movement of the shaft of the operating motor;

wherein the speed control has a zero position corresponding to a zero speed of rotation of the shaft of the operating motor, the speed control being movable out of the zero position to a nonzero position corresponding to a nonzero speed of rotation;

wherein a degree of movement of the speed control from the zero position corresponds to a speed of rotation of the shaft of the operating motor such that further movement of the speed control away from the zero position increases the speed of rotation of the shaft of the motor and movement of the speed control toward the zero position decreases the speed of rotation of the shaft of the motor; and wherein movement of the speed control from the zero position is characterized by the speed control maintaining the position of the speed control when engagement of the speed control by the hand of the operator is discontinue;

wherein the speed control is movable out of the zero position in two movement directions.

6. The apparatus of claim 5 wherein a first one of the movement directions of the speed control corresponds to a first rotational direction of the shaft of the operating motor and a second one of the movement directions of the speed control corresponds to a second rotational direction of the shaft of the operating motor.

7. The apparatus of claim 6 wherein the first movement direction is an upward direction and the second direction of movement is a downward direction.

8. The apparatus of claim 1 wherein the speed characteristic comprises a speed of rotation of the shaft of the operating motor.

9. The apparatus of claim 1 wherein the speed control is configured to control a direction of rotation of the shaft of the operating motor.

10. The apparatus of claim 1 wherein the speed control lever is pivotable with respect to the frame, the lever being pivotable in a first movement direction from the zero position to the nonzero position.

11. The apparatus of claim 10 wherein the speed control lever is pivotable in a second direction from the zero position.

12. The apparatus of claim 1 wherein the controls include a torque control engageable by the hand of the operator of the valve operating apparatus to control a torque characteristic of the movement of the shaft of the operating motor.

13. A valve operating apparatus for operating a valve having a stem rotatable to operate the valve, the apparatus comprising:

a frame assembly;

a valve operating motor mounted on the frame with a shaft being rotated during operation of the motor;

controls mounted on the frame assembly and configured to control operation of the valve operating motor, the controls including:

a speed control engageable by a hand of an operator of the valve operating apparatus to control a speed characteristic of the movement of the shaft of the operating motor, the speed characteristic comprises a speed of rotation of the shaft of the operating motor;

wherein the speed control is configured to control a direction of rotation of the shaft of the operating motor, the speed control being movable out of the zero position in two movement directions, a first one of the movement directions of the speed control corresponding to a first rotational direction of the shaft of the operating motor and a second one of the movement directions of the speed control corresponding to a second rotational direction of the shaft of the operating motor;

wherein the speed control has a zero position corresponding to a zero speed of rotation of the shaft of the operating motor, the speed control being movable out of the zero position to a nonzero position;

wherein a degree of movement of the speed control from the zero position corresponds to a speed of rotation of the shaft of the operating motor such that further movement of the speed control away from the zero position increases the speed of rotation of the shaft of the motor and movement of the speed control toward the zero position decreases the speed of rotation of the shaft of the motor; and wherein movement of the speed control from the zero position in at least one of the movement directions is characterized by the speed control maintaining the position of the speed control when engagement of the speed control by the hand of the operator is discontinued.

14. The apparatus of claim 13 wherein the speed control is configured such that movement of the speed control to the zero position from said nonzero position requires engagement of the speed control by the hand of the operator of the valve operating apparatus.

15. The apparatus of claim 13 wherein the speed control is configured such that movement of the speed control to the zero position from the nonzero position requires movement of the speed control by the hand of the operator.

16. The apparatus of claim 13 wherein the speed control is configured such that movement of the speed control to the zero position from the nonzero position requires application of a moving force by the hand of the operator to the speed control.

17. The apparatus of claim 13 wherein the first movement direction is an upward direction and the second direction of movement is a downward direction.

* * * * *